United States Patent [19]
Johnson

[11] Patent Number: 4,951,707
[45] Date of Patent: Aug. 28, 1990

[54] SEAL FOR A PUMP VALVE

[75] Inventor: Jerry E. Johnson, Houston, Tex.

[73] Assignee: National-Oilwell, Garland, Tex.

[21] Appl. No.: 335,725

[22] Filed: Apr. 10, 1989

[51] Int. Cl.$^5$ ............................................. F16K 15/02
[52] U.S. Cl. .................................. 137/516.29; 251/332
[58] Field of Search ......................... 137/516.29, 902; 251/332; 277/168

[56] References Cited

U.S. PATENT DOCUMENTS

| | | | |
|---|---|---|---|
| 2,260,381 | 10/1941 | Kennon | 137/516.29 |
| 2,903,235 | 9/1959 | Rodgers et al. | |
| 3,053,501 | 9/1962 | Varga | |
| 3,092,139 | 6/1963 | Rodgers et al. | |
| 3,191,617 | 6/1965 | Maddox | 137/516.29 |
| 3,324,880 | 6/1967 | Roberts | 137/516.29 |
| 3,409,039 | 11/1968 | Griffin | |
| 3,444,889 | 5/1969 | Kiel | 137/516.29 X |
| 3,510,103 | 5/1970 | Carsello | |
| 3,742,976 | 7/1973 | Bailey | |

Primary Examiner—Robert G. Nilson
Attorney, Agent, or Firm—Burns, Doane, Swecker & Mathis

[57] ABSTRACT

A valve element for a fluid pump comprises a rigid body and a flexible ring-shaped seal mounted on the body. The body includes an annular groove around its outer periphery in which the seal is mounted. An outer surface of the groove forms a first contact surface which engages a second contact surface defined by an inner circumference of the seal. Those contact surfaces form an angle of from 5° to 10° with the longitudinal axis of the valve element to resist the creation of a gap between those surfaces. The seal includes a longitudinally projecting annular finger which is hooked into a correspondingly shaped channel of the recess to secure the seal to the body. The contact surface of the seal is configured to reduce the compression imposed on the front end of the seal so as to render that front end relatively flexible and able to effectively absorb forces applied thereagainst by grit disposed in fluid being pumped.

19 Claims, 2 Drawing Sheets

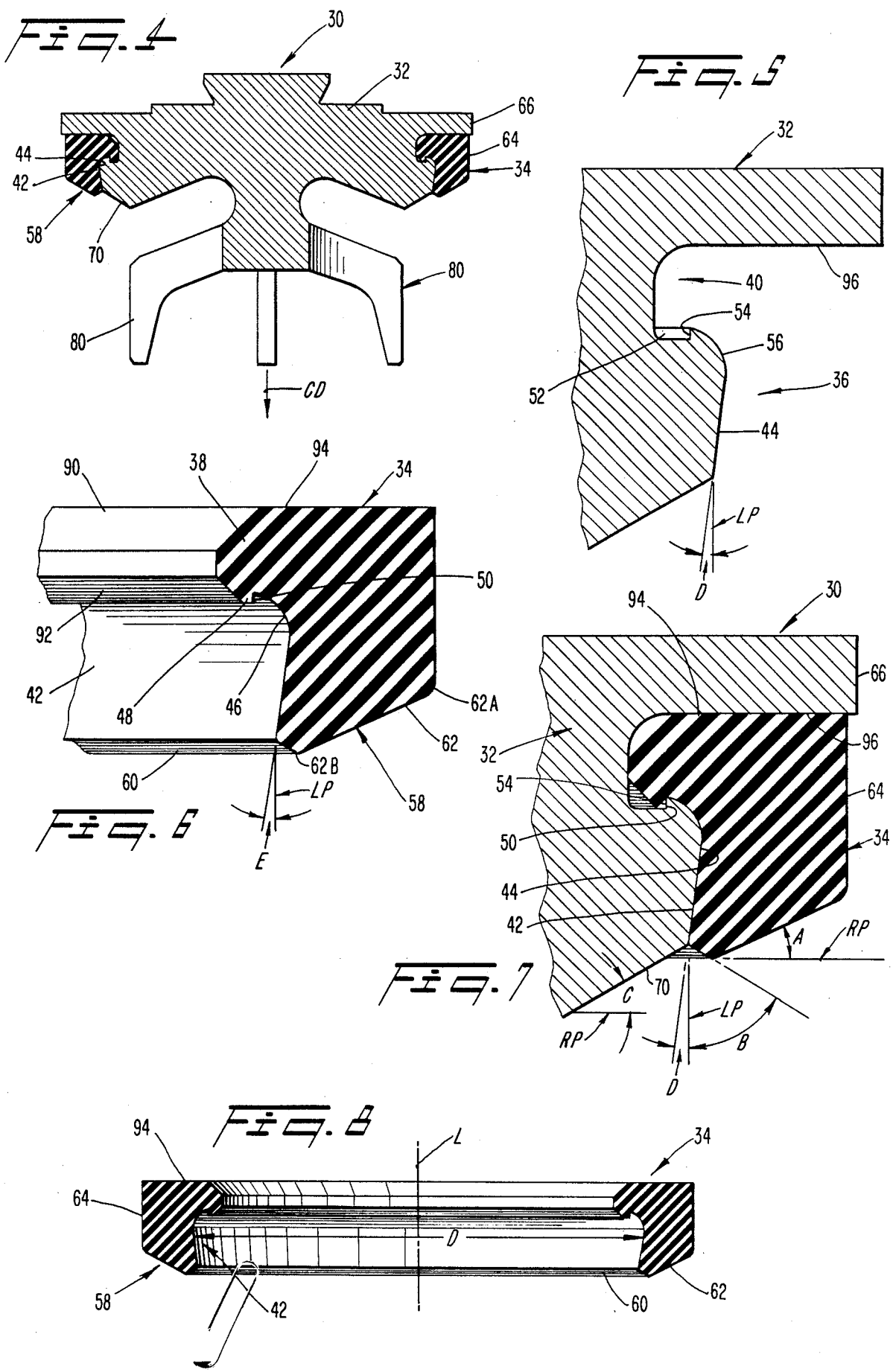

SEAL FOR A PUMP VALVE

BACKGROUND OF THE INVENTION

The present invention relates to reciprocating closure valves, especially for use in pumps which pump fluids containing a high concentration of grit.

Fluid pumps of that type are commonly used, for example, in down-hole applications wherein an existing oil or gas well bore is fractured in order to interconnect that bore with another nearby well bore. During the well fracturing operation a fracturing fluid is pumped into the well at high pressure, the fluid comprising water with a high concentration of grit (such as 1/16 inch diameter gravel). The grit, traveling rapidly under the high pressure is very abrasive, especially to the valves of the pump.

In that regard, a conventional pump, depicted schematically in FIG. 1 employs a reciprocating piston 1 or the like to suck fluid past a reciprocable inlet valve 2 and into a chamber 3 during a suction stroke, and then force the fluid through a valved discharge port 4 during a discharge stroke. The inlet valve 2 is mounted for reciprocation and is biased by a spring 5 to a closed position against a rigid frusto-conical seat 6. The inlet valve 2 is pulled open by a low pressure produced in the chamber 3 during a retraction stroke of the pump piston, and thereafter is pushed closed by a combination of the spring force and high pressure produced in the chamber 3 during an extension stroke of the pump piston. When the inlet valve closes, the high pressure fluid within the chamber 3 is pushed out through the discharge port 4 which itself contains a spring-biased valve 7.

A conventional valve 2 (depicted in FIG. 2) comprises a metal body 8 and a seal in the form of an annular elastomeric insert 9 mounted in a groove 10 formed in the outer circumference of the body. The insert includes an inwardly projecting lip portion 12 which is received in a recessed portion 10A of the groove when the insert is stretched and inserted axially onto the body. An inner cylindrical contact surface 14 of the seal tightly abuts an outer cylindrical contact surface 16 of the body once the seal has been mounted, those contact surfaces 14, 16 being coaxial with a longitudinal axis L of the valve. A frusto-conical sealing face 18 of the seal faces forwardly, i.e., faces in the valve-closing direction CD, and is adapted to abut the valve seat 6 when the valve is closed by the spring 5.

As the valve element is closing, the sealing face 18 initially makes contact with the seat 6, whereupon the insert is compressed in response to continued forward travel of the body, until the body itself engages the seat. It has been found that during that period of seal compression, the inner contact surface 14 of the valve tends to be displaced radially away from the axis L and thus away from the outer contact surface 16 of the body in a manner creating a radial gap 20 (FIG. 3) between those two contact surfaces 14, 16. That phenomenon results from a number of factors, including the existence of a slight difference in inclination between the sealing face 18 and seat 6, which difference is intentionally provided to assure that all fluid is gently pumped forwardly from between the face and the seat during interengagement thereof, rather than being trapped therebetween and ejected as a high velocity stream which could damage the surrounding components.

It has been found that the creation of the gap 20 presents a serious problem in connection with the pumping of a fluid containing a high concentration of grit, because the grit will enter and build-up within the gap in a manner gradually enlarging the gap and thereby deforming the seal element radially outwardly until a proper sealing engagement of the sealing face 18 with the seat 6 can no longer be made.

Furthermore, as regards the seal structure itself, the inner contact surface 14 of the seal forms a right angle corner with the lip portion 12. Such a right-angle geometry leads to a fracturing (notching) and premature failure of the seal when the inner contact surface 14 flexes radially outwardly.

SUMMARY OF THE INVENTION

One aspect of the present invention relates to a valve element comprising a valve body formed of a rigid material and defining a front-to-rear extending longitudinal axis. The valve body includes a generally radially outwardly facing first contact surface of a generally frusto-conical configuration tapering forwardly and forming an angle of from about 5° to about 10° with the axis as viewed in longitudinal section. The valve body also includes a radially inwardly extending annular recess disposed rearwardly of the contact surface. A seal is mounted on the body. The seal is ring-shaped and formed of an elastomeric material. The seal includes a generally radially inwardly projecting lip received in the recess of the body, and an axially forwardly facing sealing face. The seal further includes a radially inwardly facing second contact surface disposed between the sealing face and the lip and tightly engaging the first contact surface to conform to the frusto-conical configuration thereof. The presence of the 10°-20° angle minimizes any tendency for a gap to develop between the seal and body.

Preferably, the angle formed between the first contact surface and the axis is about 7°.

Preferably, when the seal is in a non-mounted, relaxed state, the second contact surface forms a second angle with the axis which is smaller than the first-named angle whereby when the seal is mounted on the body, a front portion of the seal is more flexible than a rear portion thereof and is able to absorb forces resulting from grit impacting thereagainst.

Preferably, the seal includes a concavely curved transition surface extending between the lip and a rear end of the inner contact surface, whereby the tendency for the seal to fracture is minimized.

Preferably, the recess in the body includes an axially forwardly projecting channel which defines a radially inwardly facing first shoulder. The lip on the seal includes an axially forwardly facing finger disposed in the channel and defining a radially outwardly facing second shoulder engaging the first shoulder to resist dislodgement of the lip from the recess.

Other aspects of the present invention relates to the configuration of the seal itself, and the combination of a valve element and a conical seat.

BRIEF DESCRIPTION OF THE DRAWING

The objects and advantages of the invention will become apparent from the following detailed description of a preferred embodiment thereof in connection with the accompanying drawings, in which like numerals designate like elements, and in which:

FIG. 4 is a longitudinal sectional view taken through a valve element according to the present invention;

FIG. 5 is a fragmentary longitudinal sectional view taken through a valve body according to the present invention;

FIG. 6 is a fragmentary longitudinal sectional view taken through a seal according to the present invention;

FIG. 7 is a fragmentary longitudinal sectional view taken through a valve element according to the present invention; and FIG. 8 is a longitudinal sectional view taken through a seal according to the present invention.

DETAILED DESCRIPTION OF A PREFERRED EMBODIMENT OF THE INVENTION

Figure 1:
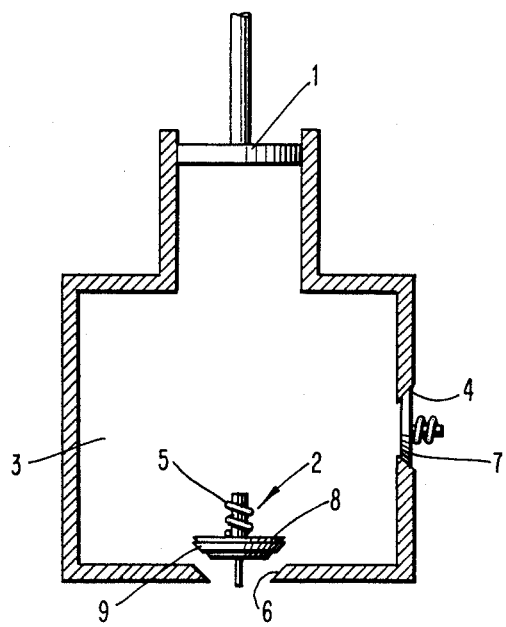
FIG. 1 is a schematic sectional view taken through a reciprocating cylinder pump.

A valve element 30 according to the present invention comprises a body 32 preferably formed of a rigid material such as metal. Mounted on the body 32 is a seal 34 in the form of an annular ring-shaped insert formed of an elastomeric material such as urethane or rubber for example. The seal 34 is mounted onto the body by being stretched and slid axially over the front end of the body (i.e., over the lower end thereof as viewed in FIG. 4) before being released to snap into an annular groove 36 of the body. In that fashion, a radially inwardly projecting annular lip 38 of the seal enters a radially inwardly recessed annular portion 40 of the groove, and an inner contact surface 42 of the insert tightly engages an outer contact surface 44 of the body (FIG. 7).

A transition between the lip 38 and a rear end of the inner contact surface 42 of the seal is defined by a concavely (radiused) curved surface 46 (FIG. 6) which terminates at the rear of a longitudinally forwardly projecting annular finger 48 of the lip 38. An outer cylindrical surface 50 of that finger forms an inner shoulder which is coaxial with the longitudinal axis L of the seal and body.

The groove 36 of the body 32 includes an annular channel 52 (FIG. 5) projecting longitudinally forwardly from the recess 40. A radially outer surface 54 of that channel defines a cylindrical outer shoulder which is coaxial with the axis L and has the same radius as the inner shoulder 50. Interconnecting the rear end of the shoulder 54 and a rear end of the outer contact surface 44 is a convexly curved outer transition surface 56 generated about a center of rotation which coincides with that of the inner transition surface 46. When the seal is seated in the groove 36, the inner contact surface 42, the inner transition surface 46, and the inner shoulder 50 enter into tight engagement with the outer contact surface 44, the outer transition surface 56, and the outer shoulder 54, respectively, as depicted in FIG. 7.

Contact between the shoulders 50, 54 locks the seal within the groove and effectively resists accidental dislodgement of the seal.

The front sealing face 58 of the seal is defined by inner and outer frusto-conical face portions 60, 62. The outer face portion 62 tapers forwardly, preferably forming an angle A of about 25° with a radial plane RP. That is, the face portion 62 is axially forwardly and radially inwardly inclined. The inner face portion 60 tapers rearwardly, preferably forming an angle B of about 60° with a longitudinal plane LP. That is, the face portion 60 is axially rearwardly and radially inwardly inclined.

An outer cylindrical surface 64 of the seal is recessed radially inwardly relative to an outer cylindrical surface 66 of the body so that when the seal expands upon longitudinal compression, the outer surface 64 of the seal will not project radially beyond the surface 66 of the body. Such a projecting portion would, if created, include a forwardly facing shoulder susceptible to being impacted and abraded by the grit.

The body 32 includes a frusto-conical abutment face 70 which tapers forwardly and is adapted to make contact with the seat 6 in order to terminate the valve closing operation. The abutment face 70 forms an angle C with a radial plane RP, preferably of about 30°, which angle corresponds to the angle of the seat 6. The sealing face 58 projects forwardly out of the plane of the abutment face 70 (as viewed in longitudinal section) to ensure that the sealing face 58 contacts the seat ahead of the abutment face 70. Since angle C exceeds angle A (i.e., the sealing face portion 62 has a larger cone angle than the abutment face 70), it is assured that the radially outer end 62A of the sealing face portion 62 will engage the seat surface 7 ahead of the radially inner end 62B thereof.

Figure 3:
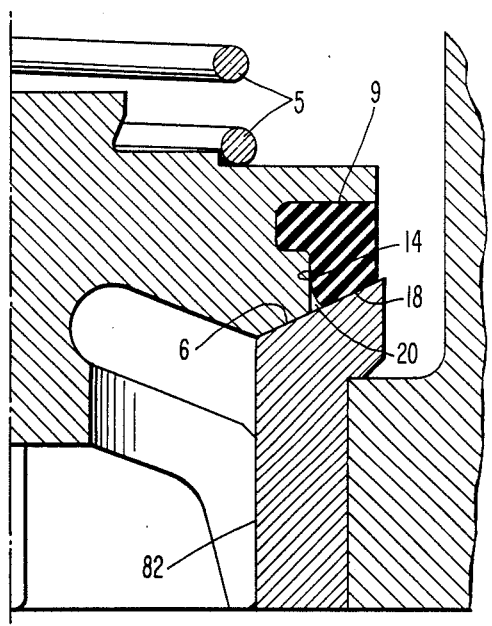
FIG. 3 is an enlarged fragmentary longitudinal sectional view taken through a conventional valve element depicted in FIGS. 1 and 2.
Figure 2:
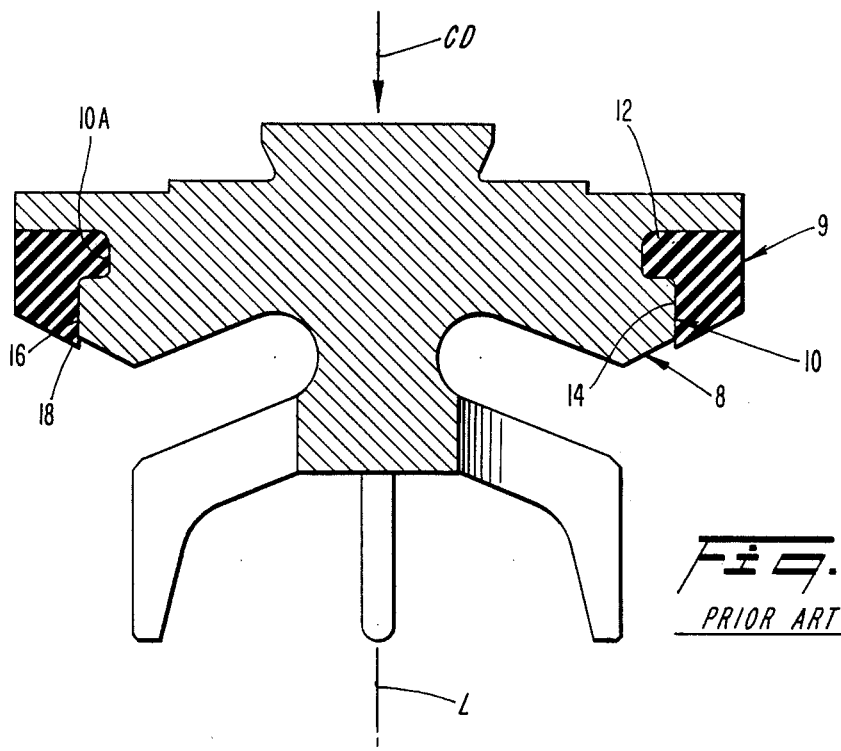
FIG. 2 is a longitudinal sectional view taken through a conventional valve element.

The inner and outer contact surfaces 42, 44 are of corresponding frusto-conical configuration oriented at a negative angle relative to the longitudinal direction, i.e, the contact surfaces 42, 44 taper in the valve closing direction, represented by the forwardly directed arrow CD in FIG. 4. That is, the surfaces 42, 44 define a progressively reducing diameter D in the forward direction (see FIG. 8). Such conical configuration of the contact surfaces resists the creation of a gap between those contact surfaces (similar to the gap 20 discussed earlier herein in connection with FIG. 3) when the sealing face 58 is forced against the seat 6, as will be hereinafter explained. The conical angle should be such as to result in the formation of an angle D (FIG. 7) with the longitudinal plane LP in the range of from about 5° to about 10°, preferably about 7°, to prevent the formation of a gap when the valve is closed.

In this regard, it will be appreciated that during a valve-closing motion, the sealing face 58 initially makes contact with, and conforms to the shape of, the seat 6. After that initial contact is made, the body continues to travel longitudinally forwardly relative to the seal until the abutment face 70 of the body 32 abuts the seat 6. During that relative movement, the seal becomes compressed. As described earlier in connection with the conventional valve element, such compression would previously result in the creation of a gap 20 (FIG. 3) between the contact surfaces. It is likely that such a tendency resulted from the fact that, due to the difference in inclination between the sealing face and seat (e.g., 25 degrees for angle A versus 30 degrees for angle C) to ensure that all fluid is pumped gently from between the seat and sealing face during the valve-closing action, the radially outer portion of the sealing face would engage the seat prior to the inner portion thereof, leading to a compressive flexure pattern in the seal which caused the inner contact surface to move radially outwardly, thereby creating the gap 20.

Since the valve element according to the present invention incorporates a difference in inclination between the sealing face 68 and seat 6, i.e., the difference between angles A and C, a tendency for the inner contact surface 42 to be displaced radially outwardly might still occur during the closing of the valve element of the present invention. However, no gap will result, because the outer contact surface 44 will occupy the area which would otherwise comprise the gap. That is, since the diameter of the outer contact surface 44 expands rearwardly (due to the angle D), forward movement of the body relative to the seal will result in the larger diameter portions of the outer contact surface traveling forwardly and filling-in any gap as such a gap would begin to form.

The angle D is defined by the rigidity of the outer contact surface 44 to which the resilient inner contact surface 42 conforms. That is, the inner contact surface will conform to the angle D of the outer contact surface once the seal has been installed (because the inner diameter of the seal is smaller than the outer diameter of the body). The angle E formed by the inner contact surface 42 (FIG. 6), when the seal is in an unmounted, relaxed state, could be equal to angle D. However, it is preferred that the angle E when the seal is in a relaxed (unmounted) state, be slightly smaller than the angle D of the outer contact surface 44, e.g., by about 3°. Thus, the angle D would lie in a range of from 2 to 7 degrees. Consequently, the front portion of the seal will not be expanded radially as much as the rear portion of the seal, so the forward portion of the seal will be in a more relaxed or flexible state than the rear portion thereof, whereby the front portion is better able to yield when impacted by grit. Hence, the forces of the impact are more effectively absorbed by the seal, and the seal is less susceptible to being damaged by the grit.

The body 30 includes forwardly projecting legs 80 which are circumferentially spaced and arranged to be guided in a conventional manner by an interior cylindrical wall 82 of the seat (see FIG. 3) as the valve element opens and closes.

The radially inner end of the lip 38 includes beveled surfaces 90, 92 to form spaces with corresponding wall portions of the recess 40 in order to enable the lip to expand within the recess when the valve is closed. A rearwardly facing surface 94 of the seal engages a forwardly facing surface 96 of the recess 40 to support the seal from behind.

In operation, the valve element is displaced longitudinally rearwardly against the bias of the spring 5 during a discharge stroke of pump and is thereafter pushed forwardly against the seat 6 by the spring 5. During such forward valve-closing motion, the sealing face 58 initially makes contact with, and conforms to the shape of, the seat 6. After that initial contact is made, the body 32 continues to travel longitudinally forwardly relative to the seal 34 until the abutment surface 70 of the body abuts the seat 6. During that relative movement, the larger diameter portions of the frusto-conically shaped outer contact surface will travel forwardly and prevent the creation of a gap between the surfaces 42, 44 of the seal and body, respectively, as described earlier herein.

Any radial outward flexing of the inner contact surface 42 which may occur will be accommodated by the curved inner transition surface 46 to inhibit the generation of stress that can cause fracturing or notching of the seal.

Since the front portion of the installed seal is more relaxed than the rear portion thereof (due to the difference between the angles D and E of the outer contact surface 44 and the inner contact surface 42 of the relaxed seal), the front end of the insert is more yieldable and better able to absorb the forces from the oncoming grit without being damaged thereby.

Although the present invention has been described in connection with a preferred embodiment thereof, it will be appreciated by those skilled in the art that additions, modifications, substitutions, and deletions not specifically described may be made without departing from the spirit and scope of the invention as defined in the appended claims.

What is claimed is:

1. A valve element comprising:
    a valve body formed of a rigid material, said body defining a front-to-rear extending longitudinal axis and including:
        a generally radially outwardly facing first contact surface of generally frusto-conical configuration tapering forwardly and forming an angle of from about 5 to about 10 degrees with said axis as viewed in longitudinal section,
        a radially inwardly extending annular recess disposed rearwardly of said contact surface, and
    a seal mounted on said body, said seal being ring-shaped and formed of an elastomeric material and including:
        a generally radially inwardly projecting lip received in said recess,
        an axially forwardly facing sealing face, and
        a radially inwardly facing second contact surface disposed between said sealing face and said lip and tightly engaging said first contact surface to conform to the frusto-conical configuration thereof.

2. A valve element according to claim 1, wherein said angle is about 7 degrees.

3. A valve element according to claim 1, wherein when said seal is in a non-mounted, relaxed state, said second contact surface forms a second angle with said axis which is smaller than said first-named angle, whereby when said seal is mounted on said body a front portion of said seal is more flexible than a rear portion thereof.

4. A valve element according to claim 3, wherein said seal includes a concavely curved transition surface extending between said lip and a rear end of said inner contact surface and engaging a convexly curved surface of said body.

5. A valve element according to claim 4, wherein said recess includes an axially forwardly projecting channel defining a radially inwardly facing first shoulder, said lip including an axially forwardly projecting finger at a radially inner end of said lip, said finger disposed in said channel and defining a radially outwardly facing second shoulder engaging said first shoulder to resist dislodgement of said lip from said recess.

6. A valve element according to claim 1, wherein said seal includes a concavely curved transition surface extending between said lip and a rear end of said inner contact surface and engaging a convexly curved surface of said body.

7. A valve element according to claim 6, wherein said recess includes an axially forwardly projecting channel defining a radially inwardly facing first shoulder, said lip including an axially forwardly projecting finger at a radially inner end of said lip, said finger disposed in said shoulder and defining a radially outwardly facing second shoulder engaging said first channel to resist dislodgement of said lip from said recess.

8. A valve element according to claim 1, wherein said recess includes an axially forwardly projecting channel defining a radially inwardly facing first shoulder, said lip including an axially forwardly projecting finger at a radially inner end of said lip, said finger disposed in said channel and defining a radially outwardly facing second shoulder engaging said first shoulder to resist dislodgement of said lip from said recess.

9. A valve element according to claim 1, wherein said sealing face comprises radially inner and outer forwardly facing frusto-conical portions, said inner portion facing axially forwardly and radially inwardly and said outer portion facing axially forwardly and radially outwardly.

10. A valve element according to claim 1, wherein a radially outer cylindrical surface of said seal is recessed radially inwardly relative to a radially outer, cylindrical surface of said body.

11. A seal adapted to be mounted in a groove of a rigid valve body, said seal being ring-shaped and defining a longitudinal axis, said seal formed of an elastomeric material and including a generally radially inwardly projecting lip adapted to be received in a recess of the body, a generally axially forwardly facing sealing face, and a radially inwardly facing contact surface disposed between said sealing face and said lip and adapted to engage a radially outwardly facing contact surface of the body, said contact surface of said seal being of forwardly tapering frusto-conical configuration which extends forwardly to said sealing face, whereby said inner contact surface defines a progressively reducing diameter toward said sealing face.

12. A seal according to claim 11, wherein said contact surface of said seal forms an angle of from about 2 to about 7 degrees with a longitudinal plane.

13. A seal according to claim 11 including a concavely curved transition surface extending between said seal and a rear end of said contact surface of said seal.

14. A seal according to claim 13, wherein a radially inner end of said lip includes an axially forwardly projecting finger adapted to be received in a channel of the recess in the body.

15. A seal according to claim 11, wherein said sealing face comprises radially inner and outer frusto-conical portions, said inner portion facing axially forwardly and radially inwardly and said outer portion facing axially forwardly and radially outwardly.

16. A seal adapted to be mounted in a groove of a rigid valve body, said seal being ring-shaped and defining a longitudinal axis, said seal formed of an elastomeric material and including a generally radially inwardly projecting lip adapted to be received in a recess of the body, an axially forwardly facing sealing face, and a radially inwardly facing contact surface disposed between said sealing face and said lip and adapted to engage a radially outwardly facing contact surface of the body, said sealing face comprising radially inner and outer forwardly facing frusto-conical portions, said inner portion facing axially forwardly and radially inwardly and said outer portion facing axially forwardly and radially outwardly.

17. A seal according to claim 16 including a concavely curved transition surface extending between said lip and a rear end of said contact surface of said seal 18. A valve assembly comprising:
a rigid seat with a frusto-conical seat surface,
a valve body movable toward and away from said seat surface and formed of a rigid material, said body defining a front-to-rear extending longitudinal axis and including:
  a forwardly facing frusto-conical abutment face having the same cone angle as said seat surface and arranged to engage said seat surface,
  a generally radially outwardly facing first contact surface of generally frusto-conical configuration facing axially forwardly and radially outwardly and forming an angle of from about 5 to about 10 degrees with said axis as viewed in longitudinal section,
  a radially inwardly extending annular recess disposed rearwardly of said contact surface, and
a seal mounted on said body, said seal being ring-shaped and formed of an elastomeric material and including:
  a generally radially inwardly projecting lip received in said recess,
  an axially forwardly facing sealing face, and forming a cone angle which is larger than said cone angle of said abutment and seat surfaces,
  a radially inwardly facing second contact surface disposed between said sealing face and said lip and tightly engaging said first contact surface to conform to the frusto-conical configuration thereof.

19. A seal according to claim 16, wherein said lip includes a forwardly projecting finger adapted to be received in a channel of the recess in the body.

* * * * *